J. W. BRIGHAM.
SEED-PLANTER.
No. 183,896. Patented Oct. 31, 1876.
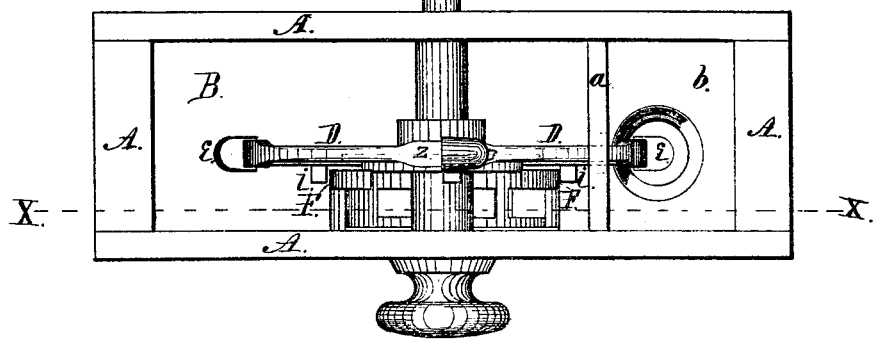
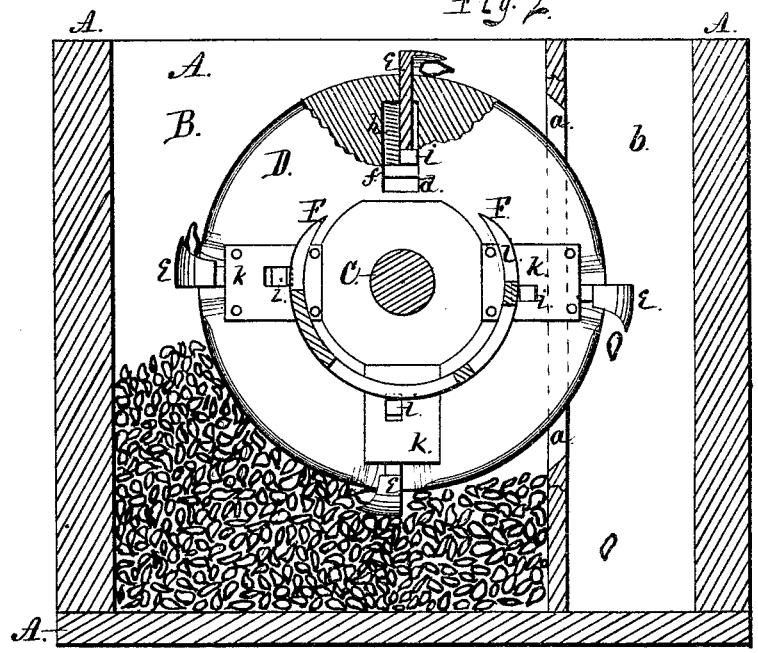
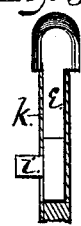 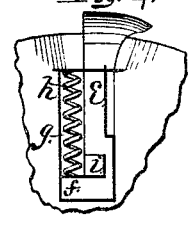 
Witnesses.
E. J. Behel
A. O. Behel
Inventor
Jonathan W. Brigham
Per Jacob Behel
Atty.

UNITED STATES PATENT OFFICE.

JONATHAN W. BRIGHAM, OF ROCKFORD, ASSIGNOR OF ONE-HALF HIS RIGHT TO O. E. LAMB, OF GUILFORD, ILLINOIS.

IMPROVEMENT IN SEED-PLANTERS.

Specification forming part of Letters Patent No. 183,896, dated October 31, 1876; application filed April 22, 1876.

*To all whom it may concern:*

Be it known that I, JONATHAN W. BRIGHAM, of the city of Rockford, in the county of Winnebago and State of Illinois, have invented a new and useful Improvement in Seed-Planting Machines, which improvement is fully set forth in the following specification, reference being had to the accompanying drawings.

My invention relates to that class of machines employed in agriculture for the purpose of depositing the different kinds of seeds in the fields prepared for its reception, either in a broadcast manner or in close drills or hills, as the judgment of the farmer may dictate, and the quality of the seed may require. It relates more particularly to that portion of the seeding-machine employed for the distribution of the seed; and consists of a horizontal shaft, provided with a seed-wheel of disk form, fitted to revolve in a vertical position within a seed-box, and provided with radially-sliding arms, the outer portions of which are of scoop form, and, in combination with the periphery of the disk form seed-cups. The sliding arms are forced toward the center of the disk by spiral springs, and are opened by a cam to receive the seed, which is held in the cup, pressed against the periphery of the disk by the action of the springs, and carried over the upper center of the disk, when the seed-cups are farther opened by the eccentric cam, permitting the seed to drop from the cup into the delivery-spout, and then to the ground or into a furrow provided for its reception.

In the drawings, Figure 1 is a plan view of my invention. Fig. 2 is a vertical sectional view on dotted line $x$, the upper portion of seed-wheel being cut on dotted line Z, to show the application of the sliding radial arms to the disk. Figs. 3, 4, and 5 represent different views of the radial sliding arms as applied to the disk.

In the drawings, A represents the walls of a seed-box, which is of rectangular form, and is separated into two compartments by a transverse vertical partition, $a$, the larger portion B being the seed-receptacle, and the smaller portion $b$ being the delivery portion, provided with an opening in the bottom, through which the seed drops. C is a transverse shaft, fitted to revolve in bearings in the sides of the seed-box. A seed-wheel, D, of disk form is mounted on the shaft C, and fitted to revolve in the seed-box, a portion of the disk seed-wheel projecting into the delivery portion $b$, the partition $a$ being slotted vertically to permit it to revolve freely in the box. The seed-wheel D is fitted with radial grooves $d$ at proper intervals, cut through at the periphery, to receive the radial slides $e$, so that their outer ends, which are of scoop form, overlap the outer face of the wheel on the side to which it moves, forming a cup to receive and carry up the seed as it revolves. The slides $e$ are provided with a foot, $f$, which extends rearward in the chambered portion $g$ of the radial grooves. $h$ is a spiral spring placed in the chamber $g$, between the foot $f$ and the outer end of the chamber, the action of which forces the slides inward to gripe and hold the seed in the cup. The slides are also fitted with an outward-projecting arm, $i$. $k$ are plates slotted to receive the arms $i$, and are secured to the side of the seed-wheel, to hold the parts in place, in such a manner as to permit of a limited outward sliding movement of the slides $e$, and to protect the parts from dirt. F is a cam of circular form, consisting of a portion of a circle, secured to the side of the seed-box, eccentric to the axis of the seed-wheel, and in such a manner that its greatest distance from the center of the seed-wheel is at the point $l$, at which the seed is to be liberated from the seed-cups, to deposit it in the delivery portion of the seed-box.

The cam F is located relatively to the seed-wheel in such a manner that as the wheel revolves the arms $i$ will come in contact with the cam F, causing the slides $e$ to move outward, which, being forced inward by the action of the spiral springs $h$, will conform to the acting surface of the cam, which holds the seed-cups open as they enter the seed-receptacle, and in passing through the seed will be filled, and in their onward movement will recede and hold the seed firmly in the cup until it is carried into the delivery portion of the seed-box, at which point the arms $i$ come in contact with the more prominent portion of the cam, causing the seed-cups to open and deliver the seed into the delivery portion of the seed-box, from which it descends into the prepared ground.

My improved seed-wheel is designed to be employed on seeding-machines of the different varieties now in common use, and when so employed, motion will be imparted to the seed-wheel from any convenient portion of the rotating parts of the machine, in any of the common methods, such as belting or gear-wheel connection, constructed in a changeable manner, so as to vary the velocity of the seed-wheel, to vary the quality of the seed deposited.

In using my seed-wheel as a planter for corn, beans, pease, and similar seeds, it is designed to construct the seed-cups to generally take up one seed each, and deposit them in drills in nearly equal intervals; and when used to plant in hills or in check-rows, a check or flipper valve will be employed in the delivery-spout to receive the proper quantity of seed to form a hill, from which the seed will be dropped to the furrow by a movement of the check or flipper valve, in the usual manner.

The disk D, projecting through the slot in the partition a, serves to lessen the opening in the partition, and prevents the accidental throwing of seed by the rotating disk into the delivery-chamber.

I claim as my invention—

1. In a seed-distributing wheel of disk form, substantially as described, rotating in a seed-receptacle, the radial slide e, with scoop-formed outer ends, fitted to overlap the outer face of the disk, adapted to pick up and hold the seed griped between scoop-formed heads and outer face of the disk, to deposit it in a delivery-chamber or outlet, substantially as and for the purpose hereinbefore set forth.

2. In a seed-distributing wheel of disk form, substantially as described, rotating in a seed-receptacle, the radial slides e, in combination with the cam F, for operating the slide e, as and for the purpose set forth.

JONATHAN W. BRIGHAM.

Witnesses:
A. C. NASH,
JOHN M. BUELL.